C. P. ZIMMERMAN.
Liquid Cooler.
No. 51,275.        Patented Nov. 28, 1865.
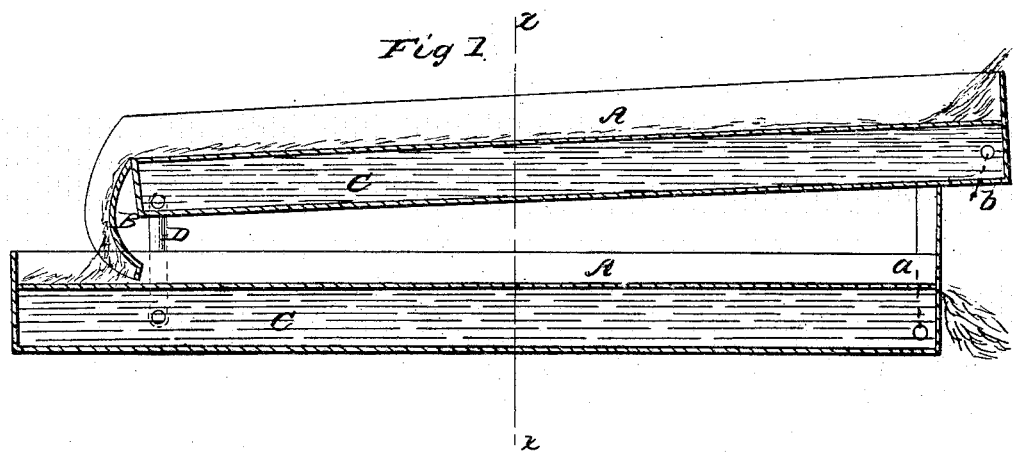
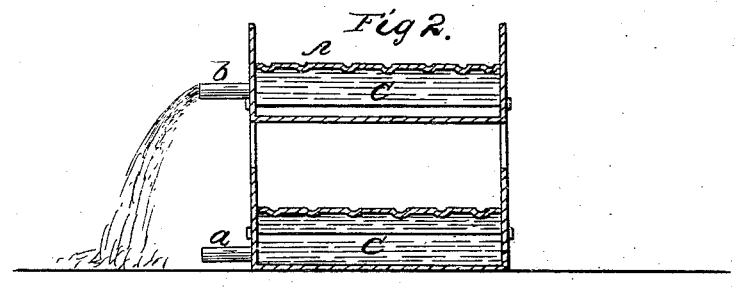
Witnesses:      Inventor:

UNITED STATES PATENT OFFICE.

CHARLES P. ZIMMERMAN, OF NEWARK, NEW JERSEY, ASSIGNOR TO HIMSELF AND ISAAC P. BROWN, OF PLAINFIELD, NEW JERSEY.

IMPROVED LIQUID-COOLER.

Specification forming part of Letters Patent No. 51,275, dated November 28, 1865.

*To all whom it may concern:*

Be it known that I, CHARLES P. ZIMMERMAN, of Newark, in the county of Essex and State of New Jersey, have invented a new and Improved Liquid-Cooler; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of this invention. Fig. 2 is a transverse section of the same, the line $x\ x$, Fig. 1, indicating the plane of section. Fig. 3 is a modification of the same.

Similar letters of reference indicate like parts.

This invention relates to a cooler for beer and other liquids, composed of series of chutes placed in an inclined position and communicating with each other by means of suitable curved aprons, in combination with chambers secured to the under sides of the chutes and communicating with each other by means of suitable pipes in such a manner that the beer or other liquid to be cooled can be made to run down successively over the several chutes, while at the same time water or other cooling-liquid is caused to run in an opposite direction through the chambers under said chutes, and the beer or other liquid to be cooled, while running over the chute, is exposed on one side to the cooling influence of the atmosphere and on the opposite side to that of the water or cooling-liquid, and the operation of cooling is effected rapidly and with little labor or expense.

A A represent a series of chutes, made of sheet metal or any other suitable material, with a flat or corrugated bottom, and arranged one above the other in inclined positions in such a manner that beer let on the upper end of the first chute runs down over the same and on the upper end of the second chute and so on, and while running over these chutes it (the beer or other liquid to be cooled) is exposed to the cooling influence of the atmosphere.

To prevent splashing as the beer discharges from one chute on the other curved aprons B are applied one to the lower end of each chute, over which the beer or other liquid to be cooled descends without splashing.

Under the bottoms of the chutes are formed chambers C, which communicate with each other through pipes D. To the lowest end of the lowest chamber cold water or other cooling-liquid is admitted through a pipe, $a$, and after having passed up through all the chambers said cooling-liquid discharges through the pipe $b$. The cooling-liquid is thus caused to run in a direction opposite to that in which beer or liquid to be cooled runs, and the full benefit and effect of the cooling-liquid on the liquid to be cooled is obtained.

It must be remarked that the chambers C, instead of being made as shown in Figs. 1 and 2, may be made as shown in Fig. 3, where they are formed between two chutes of metal, each of which is provided with a series of semicircular channels.

I do not wish to confine myself, therefore, to any particular form or shape of the chambers, but reserve the right to make them as may be desirable.

I claim as new and desire to secure by Letters Patent—

The arrangement of a series of chutes, A A, and aprons B, in combination with the cooling-chambers C, connected with each other by pipes D, and arranged in relation to each other and to the chutes A A substantially in the manner and for the purpose described.

CHARLES P. ZIMMERMAN.

Witnesses:
M. M. LIVINGSTON,
C. L. TOPLIFF.